United States Patent [19]

Taboada

[11] 4,443,696
[45] Apr. 17, 1984

[54] OPTICAL BEAM INTENSITY CONTROL SYSTEM

[76] Inventor: John Taboada, 12530 Elm Country, San Antonio, Tex. 78230

[21] Appl. No.: 297,526

[22] Filed: Aug. 28, 1981

[51] Int. Cl.³ .............................................. G01V 1/20
[52] U.S. Cl. ..................................... 250/205; 250/201
[58] Field of Search ...................... 250/205, 201, 229

[56] References Cited

U.S. PATENT DOCUMENTS

| | | | |
|---|---|---|---|
| 3,454,775 | 7/1969 | Gibbs | 250/205 X |
| 3,778,791 | 12/1973 | Lewicki et al. | 250/552 X |
| 3,864,037 | 2/1975 | Johnson | 250/213 VT |
| 4,378,490 | 3/1983 | Luigi | 250/205 X |

Primary Examiner—William L. Sikes
Assistant Examiner—Darwin R. Hostetter
Attorney, Agent, or Firm—Donald J. Singer; Jacob N. Erlich

[57] ABSTRACT

An optical beam intensity control system having a light controller which allows a beam of electromagnetic energy of varying intensity to pass therethrough. A beam splitter directs a portion of the output beam to a detector which provides a signal indicative of the intensity of this beam to a threshold control signal generator. The control signal generator compares the intensity signal with a preselected intensity range and provides a signal indicative of whether or not the intensity of the beam falls within the preselected intensity range. The light controller operates in accordance with the signal from the control signal generator in order to maintain the output beam of the variable beam of electromagnetic energy within the preselected intensity range.

6 Claims, 4 Drawing Figures

FIG.2
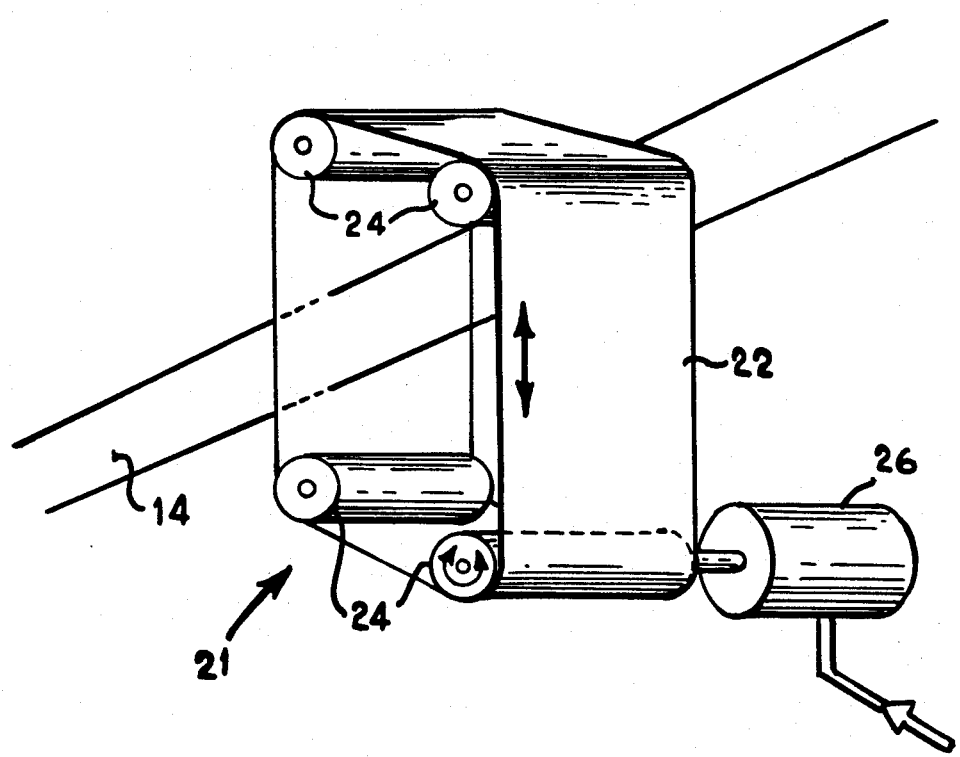
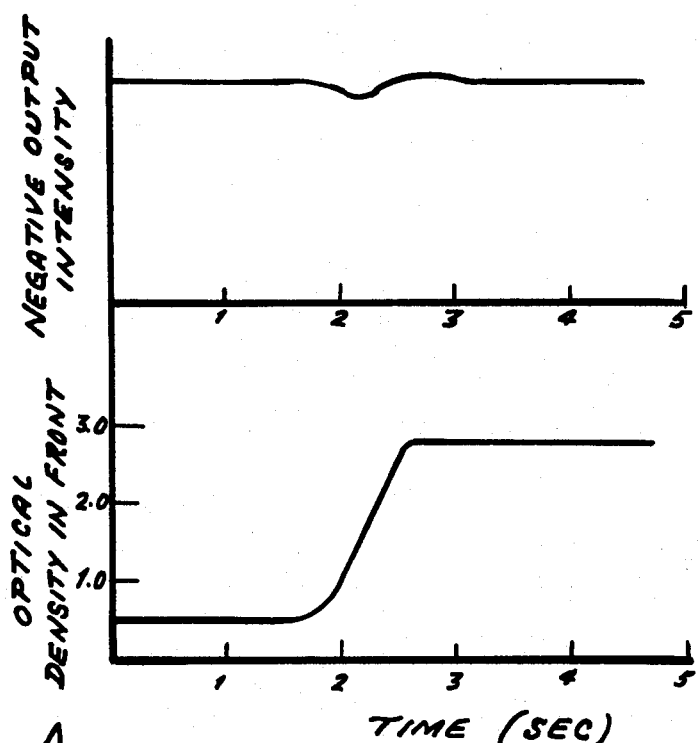
FIG.4

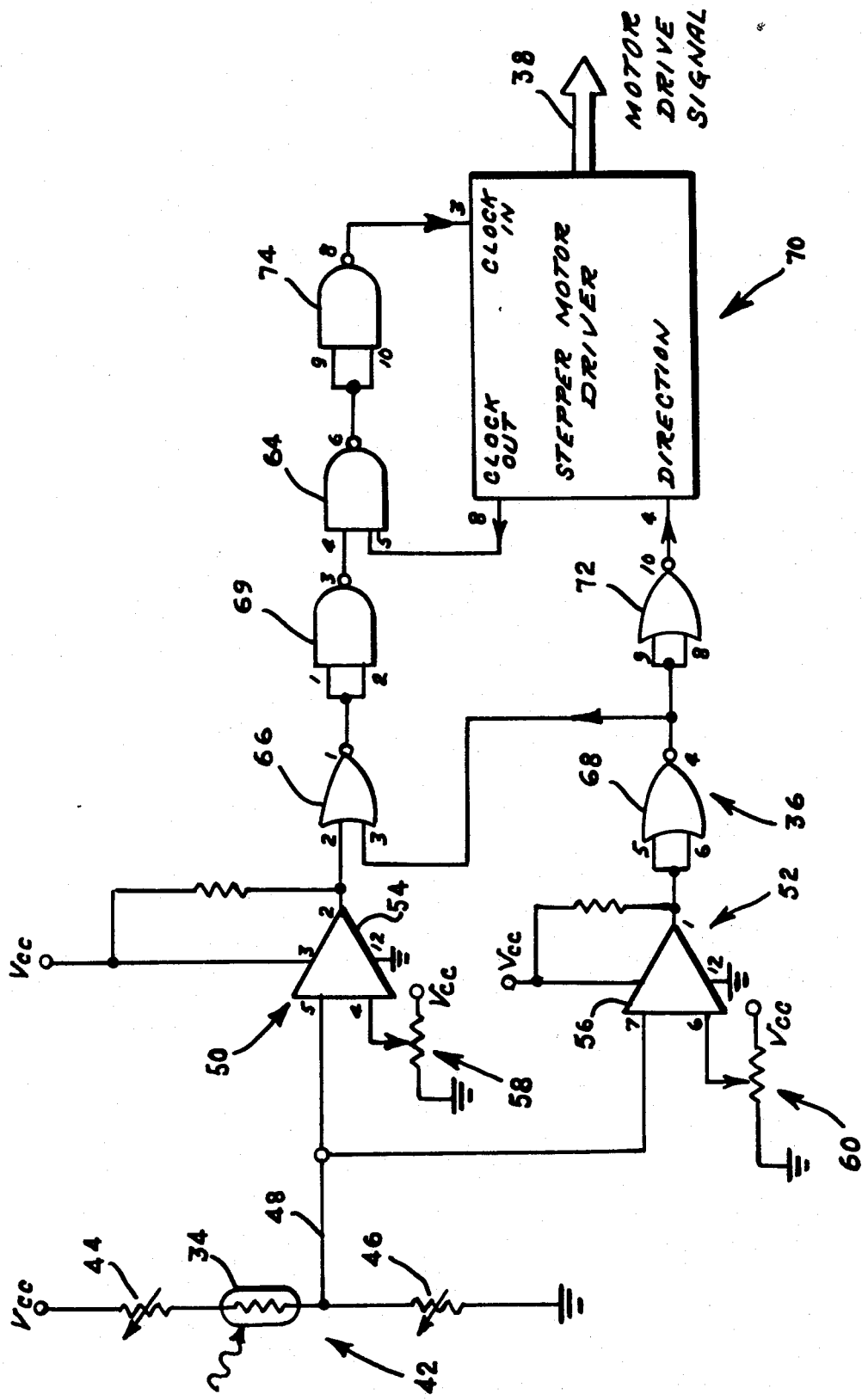

OPTICAL BEAM INTENSITY CONTROL SYSTEM

STATEMENT OF GOVERNMENT INTEREST

The invention described herein may be manufactured and used by or for the Government for governmental purposes without the payment of any royalty thereon.

BACKGROUND OF THE INVENTION

This invention relates generally to beam intensity controllers and, more particularly, to an optical beam intensity control system which automatically controls the intensity of a beam of light independently of the source of the optical energy.

It is often necessary to control the intensity of a light source without affecting the energy source for the light generation. This occurs in such diverse applications as exposure control in photography, laser communication beam intensity control, video camera exposure limitation, laser interferometry, holography, spectrophotometry, densitometry, colorimetry and within, for example, an optical distortion analyzer system as described in U.S. patent application entitled Optical Distortion Analyzer System, Ser. No. 297,527 filed Aug. 28, 1981 by this inventor.

In general, a beam intensity controller is utilized in conjunction with a source of light which generates a fluctuating or varying intensity beam. The beam passes through the controller which compensates for the fluctuations and outputs therefrom a time invariant light field. There are many various types of controllers found in the prior art. For example, there are iris controllers in photographic cameras, Pockels cell and Kerr cell polarization modulators, liquid crystal devices and the like. Unfortunately, all of these devices have notable drawbacks.

An iris or aperture controller affects the modulation transfer function, that is, a reduced aperture not only reduces the light transmission but also reduces the resolution capability of the optical system. Polarization modulators depend upon a high degree of polarization of the generated light source.

There are other controllers which depend upon the diffraction of the incident light source such as in Bragg cells wherein an acoustic signal is used to create a diffraction grating in a solid such as a quartz. In these devices the apertures are extremely limited as only certain incident angles experience the greatest diffraction modulation. In addition, this type of procedure is wavelength dependent.

Still further prior art may include modulation through frustrated total internal reflection. However, such a procedure is also a wavelength dependent process and may depend upon the polarization. Finally, there are numerous systems which achieve intensity control by modulating the energy source. By so doing, this type of intensity control cannot be used with systems which rely upon an unmodulated source of energy.

It is therefore essential and of great importance to provide an optical beam intensity control system which not only controls the intensity of a light beam without affecting the energy source but which is also highly reliable, efficient, and does not contain the drawbacks associated with prior art intensity controllers.

SUMMARY OF THE INVENTION

The optical beam intensity control system of the invention is capable of effectively controlling the intensity of a light source independently of the energy source utilized for light generation and overcomes the problems set forth in detail hereinabove and encountered with prior art beam intensity controllers.

The optical beam intensity control system of this invention is utilized in conjunction with any suitable beam of light such as, for example, a laser or a lamp. The intensity control system incorporates therein a light intensity controlling device in the form of, for example, a variable density filter wheel which intercepts the beam of light emanating from the light source. The light beam after passing through the light intensity controller is intercepted by a beam splitter which allows a major portion of the beam to pass therethrough as the output from the control system and another portion of the beam to be directed to a light gathering lens which focuses this portion of the light beam onto a detector. The detector passes a signal into a control signal generator. The control signal generator provides a signal which is capable of modifying the status of the light controller in the appropriate magnitude to compensate for the time variations of the incident beam such that the output of the light source is maintained time invariant or constant.

It is therefore an object of this invention to provide an optical beam intensity control system which is capable of controlling the intensity of a light beam without affecting the energy source.

It is a further object of this invention to provide an optical beam intensity control system which is capable of controlling the intensity of a light beam without affecting the polarization of the light, the F-number or the numerical aperture of an optical system utilizing the control system of this invention.

It is another object of this invention to provide an optical beam intensity control system which does not modify a broad range of the electromagnetic spectrum, has an extremely wide acceptance angle and aperture, and a large dynamic attenuation range.

It is still a further object of this invention to provide an optical beam intensity control system which includes a light controller which is based on threshold logic thereby allowing adjustment of the response error for close tracking or tracking with hysterisis.

It is still a further object of this invention to provide an optical beam intensity control system which is economical to produce and which utilizes many conventional, currently available components that lend themselves to standard mass producing manufacturing techniques.

For a better understanding of the present invention, together with other and further objects thereof, reference is made to the following description taken in conjunction with the accompanying drawing and its scope will be pointed out in the appended claims.

DETAILED DESCRIPTION OF THE DRAWING

FIG. 2 is a pictorial representation of an alternate embodiment of the light controller which can be utilized with the optical beam intensity control system of this invention;

FIG. 3 is a schematic circuit diagram representing the voltage divider network and control signal generator utilized within the optical beam intensity control system of this invention; and FIG. 4 is a graphic representation depicting qualitatively performance of the optical beam intensity control system of this invention.

DETAILED DESCRIPTION OF THE PREFERRED EMBODIMENT

Figure 1:
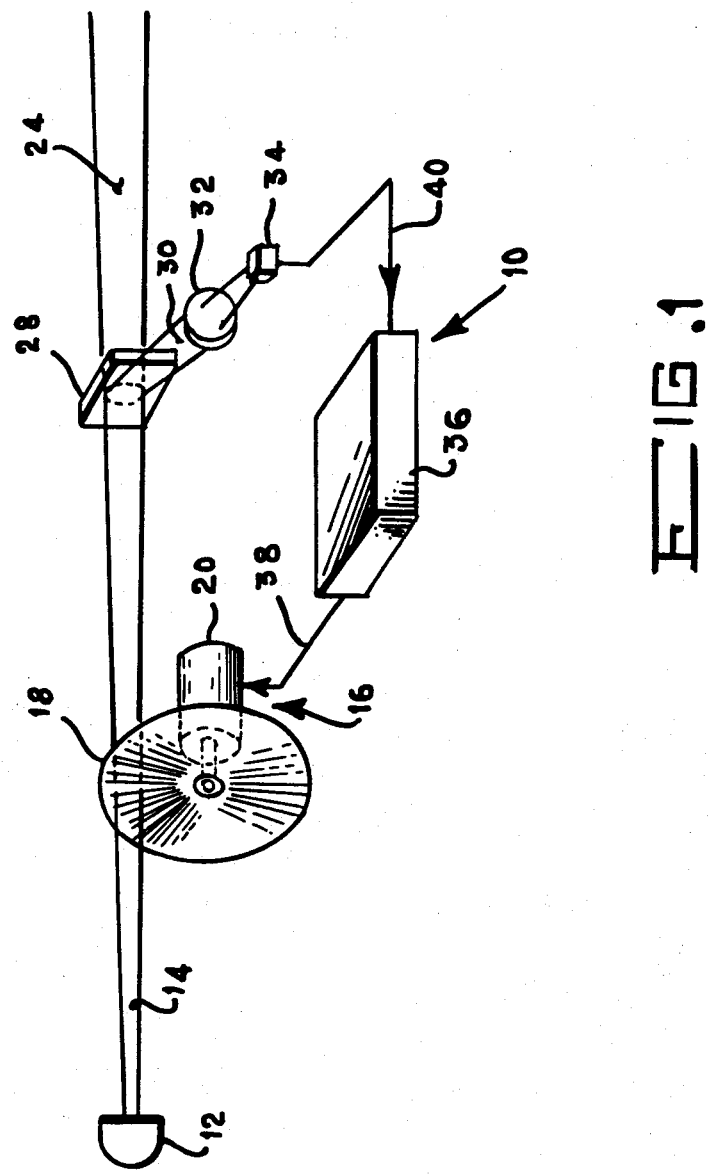
FIG. 1 is a schematic representation, shown partly in pictorial fashion, of the optical beam intensity control system of this invention.

Reference is now made to FIG. 1 of the drawing which illustrates in schematic and partially pictorial fashion the optical beam intensity control system 10 of this invention. Control system 10 is utilized with any conventional source of electromagnetic energy 12 in the form of, for example, a laser or lamp which emits a beam of light 14, the intensity of which, is to be controlled. Situated in optical alignment with and intercepting beam 14 is an intensity controlling device or light controller 16 forming a part of the control system 10 of this invention.

As illustrated in FIG. 1 of the drawing the intensity controlling device 16 may be in the form of, for example, a variable density filter wheel 18 automatically driven by a conventional stepping motor 20 of the type manufactured by Aerotech Inc. as Model 200. The appropriate rotation of filter wheel 18 in a manner to be described in detail hereinbelow alters the actual intensity of beam 14 and can be varied accordingly.

It should be realized, however, that although a filter wheel 18 is utilized for varying the intensity of beam 14 other types of intensity controlling devices can be substituted therefor. An example of another such light intensity controlling device or light controller 21 is depicted in FIG. 2 of the drawing as a continuous transparent film 22 of variable attenuation mounted upon a plurality of rollers 24 and operated by a conventional stepping motor 26.

Referring once again to FIG. 1 of the drawing, further making up the control system 10 of this invention is a beam directing element in the form of, for example, a beam splitter 28 which is situated adjacent intensity controlling device 16 and also intercepting beam 14. Beam splitter 28 enables the major portion of beam 14 to pass therethrough as the output 29 from controller 10 while directing a minor portion of beam 14, hereinafter referred to as beam 30, as a beam to be sampled by the control system 10 of this invention.

Beam 30 after being directed by beam splitter 28 is optically aligned with a conventional gathering lens or focusing lens 32. Lens 32 focuses beam 30 onto a conventional detector 34 made up of, for example, of a photo resistor element more appropriately illustrated in FIG. 3 of the drawing. Detector 34 provides a signal indicative of the intensity of beam 30 (and thereby beam 14). This signal is fed into a novel threshold control signal generator 36 to be described in detail hereinbelow with respect to FIG. 3 of the drawing.

The filter wheel 18 of intensity controlling device 16, (or continuous film 22 of controlling device 21) is actuated in terms of direction of rotation and number of steps by signals 38 delivered from control signal generator 36. A continuous feedback signal 40 is derived from the output of detector 34 which senses the intensity of beam 14 (by way of beam 30). Filter wheel 18 in response to controlling signals 38 rotates in the appropriate direction and magnitude to restore and maintain a constant intensity in output beam 29.

For a clearer understanding of this invention it is necessary to now refer to FIG. 3 of the drawing in which the components and operation of the threshold control signal generator 36 are explained as well as their relationship to detector 34. Referring to FIG. 3 of the drawing detector 34 is illustrated as being, for example, a photo resistor element which is part of a voltage divider network 42 when utilized in combination with variable resistors 44 and 46.

The output 48 of voltage divider network 42 is proportional to the light intensity sensed by detector 34 and is applied to the input of two comparator circuits 50 and 52, both incorporating therein a single standard conventional IC type 339 Quad comparator chip 54 and 56. The numbers situated adjacent to comparator chips 54 and 56 are representative of standard pin numbers associated with such chips. It should also be realized that in the following description of similar type components within the threshold control signal generator 36 appropriate pin numbers will be associated with all such components.

Comparators 54 and 56 are set by conventional voltage dividers 58 and 60, respectively, to establish an upper and lower bound or limit. Light which falls outside of these limits cause actuation of filter wheel stepping motor 20 to occur in a manner to be set forth in greater detail hereinbelow.

Still referring to the circuit of generator 36, the output of either comparator 54 and 56 will actuate a conventional Logic NAND gate 64 through conventional NOR gates 66 and 68, respectively, and NAND gate 69. Throughout the specification and description of generator 36 two standard logic IC gates are utilized which, for example, may be type 7402 Quad NOR gates and type 7400 Quad NAND gates.

As shown in FIG. 3 NAND gate 64 permits the passing of stepper motor clock pulses from a conventional stepper motor driver 70 under certain conditions. An example of a stepper motor driver 70 which can be used with this invention would be an Aerotech Inc. translator card Model 200-1. With such a driver 70, pin 8 thereof is operably connected to pin 5 of NAND gate 64.

Stepper motor clock pulses are fed back into pin 3 of driver 70 under appropriate conditions. Therefore, the direction of movement of stepper motor 20 (which is operably connected to filter wheel 18) in order to increase or decrease attenuation depends upon the status of the lower threshold sensor or comparator circuit 52 through NOR gates 68 and 72. The output of comparator 56 is interconnected through gates 68 and 72 to pin 4 of stepper driver 70. As shown in FIG. 3 of the drawing, gates 69 and 72 act as buffers while a NAND gate 74 is wired to perform a conventional logic conversion.

More succinctly, if the lower threshold is exceeded filter wheel 18 will proceed in a pre-established direction as long as the upper threshold has been exceeded. On the other hand if the intensity has fallen below the upper and lower thresholds the direction of filter wheel 18 is reversed. By so doing the light intensity is maintained as it passes through filter wheel 18 at a level between the two thresholds.

MODE OF OPERATION

Still referring to FIG. 3 of the drawing, it is clearly shown therein that comparator circuit 50 is set to define an upper limit of light intensity while comparator circuit 52 defines the lower limit of light intensity, with the acceptable range situated therebetween. The output signal 38 from the threshold control generator 36 is dependent upon the intensity of light detected by detector 34.

Under conditions in which the intensity of light does not exceed either the upper limit or fall below the lower limit filter wheel 18 remains stationary and continues to remain stationary until the intensity changes to either above or below the desired threshold levels. If the intensity is above the upper threshold limit, that is the threshold of both comparators 54 and 56 are exceeded then stepper pulses from stepper motor driver 70 are delivered by way of gate 64 as the output signal 38 thereby rotating filter wheel 18 in a predetermined direction until the point at which the upper limit of comparator 54 is no longer exceeded. If the intensity of the light source falls below the lower limit of comparator 56 (and therefore also below comparator 54) a signal from comparator 56 through gates 68 and 72 changes the direction of stepper motor 20 as well as passes pulses through gates 64 and 74 to continue the rotation of filter wheel 18.

In other words, motor action, driving filter wheel 18 compensating for changing in intensity will take place if the light intensity falls outside of a pre-determined "window" or threshold logic level. Filter wheel 18 will rotate until the intensity is such that the detector 34 will send a level that falls within the "window". The closeness of the intensity tracking can be readily adjusted by setting the comparator threshold levels.

The performance of the intensity control system 10 of this invention is shown qualitatively in FIG. 4 of the drawing for the control of, for example, a laser beam. The output intensity remains constant as the input intensity is varied over a large factor of approximately 100. With appropriate choice of components for the circuit of control signal generator 36, the dynamic range can be made even greater. Therefore the light intensity control system 10 of this invention can serve in numerous applications where the source cannot be manipulated and control is dependent on external means.

Although this invention has been described with reference to a particular embodiment, it will be understood to those skilled in the art that this invention is also capable of a variety of alternative embodiments within the spirit and scope of the appended claims.

I claim:

1. An optical beam intensity control system comprising:
   means in optical alignment with and intercepting a beam of electromagnetic energy for allowing said beam to pass therethrough and for controlling the intensity of said beam passing therethrough in accordance with a predetermined signal, said predetermined signal being based upon a preselected intensity range, and said intensity controlling means including means of variable density interposed within said beam of electromagentic energy and means operably connected thereto for controlling said variable density means in accordance with said predetermined signal;
   means in the form of an intensity detector in optical alignment with said beam passing through said intensity controlling means for receiving this beam and providing a signal indicative of said intensity of said beam after having passed through said intensity controlling means; and
   means operably connected between said intensity detector and said intensity controlling means for analyzing said intensity signal and providing said predetermined signal to said intensity controlling means, said analyzing means including a threshold control signal generator for receiving said intensity signal and comparing said intensity signal with a set of standards representative of said preselected intensity range whereby when said intensity signal falls within said preselected intensity range said intensity controlling means remains inactive and when said signal falls outside of said preselected intensity range said intensity controlling means is activated until said intensity signal falls within said preselected intensity range.

2. An optical beam intensity control system as defined in claim 1 wherein said threshold control signal generator further comprises means for providing a signal indicative of whether said intensity signal falls above or below said preselected intensity range in order to control said intensity controlling means accordingly.

3. An optical beam intensity control system as defined in claim 2 wherein said variable density means comprises a rotatable variable density filter wheel.

4. An optical beam intensity control system as defined in claim 2 wherein said variable density means comprises a rotatable continuous transparent film of variable attenuation.

5. An optical beam intensity control system as defined in claim 1 wherein said filter wheel controlling means comprises a stepper motor.

6. An optical beam intensity control system as defined in claim 5 wherein said beam receiving and intensity signal providing means further comprises means optically aligned with said beam passing through said intensity controlling means and said detector for directing a portion of this beam to said detector.

* * * * *